United States Patent
Yuan et al.

(10) Patent No.: US 10,965,722 B1
(45) Date of Patent: Mar. 30, 2021

(54) LOCAL AREA NETWORK ARCHITECTURE FOR SUPPORTING MULTIPLE IP SERVICES

(71) Applicant: Verizon Patent and Licensing Inc., Arlington, VA (US)

(72) Inventors: Jun Yuan, Cranbury, NJ (US); Muhammad Salman Nomani, Somerset, NJ (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/588,404

(22) Filed: Sep. 30, 2019

(51) Int. Cl.
*H04L 29/06* (2006.01)
*H04L 12/24* (2006.01)

(52) U.S. Cl.
CPC ........ *H04L 65/1069* (2013.01); *H04L 41/048* (2013.01); *H04L 65/1006* (2013.01); *H04L 65/1016* (2013.01); *H04L 65/1059* (2013.01)

(58) Field of Classification Search
CPC ............... H04L 41/048; H04L 65/1006; H04L 65/1016; H04L 65/1059; H04L 65/1069
See application file for complete search history.

(56) References Cited

U.S. PATENT DOCUMENTS

| | | | |
|---|---|---|---|
| 9,654,964 B1* | 5/2017 | Carames | ............ H04L 65/1073 |
| 10,440,665 B1* | 10/2019 | Witherell | ............ H04W 24/08 |
| 2010/0064045 A1* | 3/2010 | Jalkanen | ............... H04L 65/105 709/227 |
| 2010/0329243 A1* | 12/2010 | Buckley | ............. H04L 65/1069 370/352 |
| 2016/0269899 A1* | 9/2016 | Carames | ................. H04W 8/02 |
| 2018/0070323 A1* | 3/2018 | Zhan | ..................... H04W 52/46 |
| 2019/0052994 A1* | 2/2019 | Dar | ......................... H04W 4/38 |
| 2019/0215729 A1* | 7/2019 | Oyman | .................. H04L 65/80 |
| 2019/0222978 A1* | 7/2019 | Dar | ..................... H04L 65/1016 |

OTHER PUBLICATIONS

IANA.org. "Session Initiation Protocol (SIP) Parameters", publicly posted Mar. 13, 2019, 51 pages. (Year: 2019).*
Internet Engineering Task Force. "SIP Caller Preferences and Callee Capabilities", draft-ietf-mmusic-sip-caller-00, Feb. 26, 1999, 16 pages. (Year: 1999).*
Network Working Group. "Request for Comments (RFC) 3261: SIP: Session Initiation Protocol", Jun. 2002, 269 pages. (Year: 2002).*

(Continued)

*Primary Examiner* — George C Neurauter, Jr.

(57) ABSTRACT

A network device receives an indication to establish a session for an internet protocol (IP) service between a first device and a second device, wherein the network device is part of a local network with the first device and another network device. The network device identifies a service tag to include in a service tag field of a session request. The other network device causes the session request that includes an updated service tag to be provided to the second device. The second device provides a session response with the service tag to the other network device, the other network device updates the session response to include the original service tag and provides an updated session response to the network device. The network device causes the session to be established.

20 Claims, 10 Drawing Sheets

(56) References Cited

OTHER PUBLICATIONS

Network Working Group. "Request for Comments (RFC) 3666: Session Initiation Protocol (SIP) Public Switched Telephone Network (PSTN) Call Flows", Dec. 2003, 118 pages. (Year: 2003).*

Network Working Group. "Request for Comments (RFC) 3960: Early Media and Ringing Tone Generation in the Session Initiation Protocol (SIP)", Dec. 2004, 13 pages. (Year: 2004).*

Network Working Group. "Request for Comments (RFC) 5688: A Session Initiation Protocol (SIP) Media Feature Tag for MIME Application Subtypes", Jan. 2010, 7 pages. (Year: 2010).*

Network Working Group. "Request for Comments (RFC) 5897: Identification of Communications Services in the Session Initiation Protocol (SIP)", Jun. 2010, 23 pages. (Year: 2010).*

Network Working Group. "Request for Comments (RFC) 6050: A Session Initiation Protocol (SIP) Extension for the Identification of Services", Nov. 2010, 19 pages. (Year: 2010).*

* cited by examiner

LOCAL AREA NETWORK ARCHITECTURE FOR SUPPORTING MULTIPLE IP SERVICES

BACKGROUND

A local network (e.g., a local a area network (LAN), a home network or home area network (HAN), and/or the like) may refer to a type of network that facilitates communication between devices within or near a home. The local network may include, for example, a group of user devices (e.g., a desktop computer, a laptop computer, a smartphone, a smart TV, and/or the like), an access point device (e.g., a router), a gateway, a modem, and/or the like.

DETAILED DESCRIPTION OF PREFERRED EMBODIMENTS

Figure 1A:
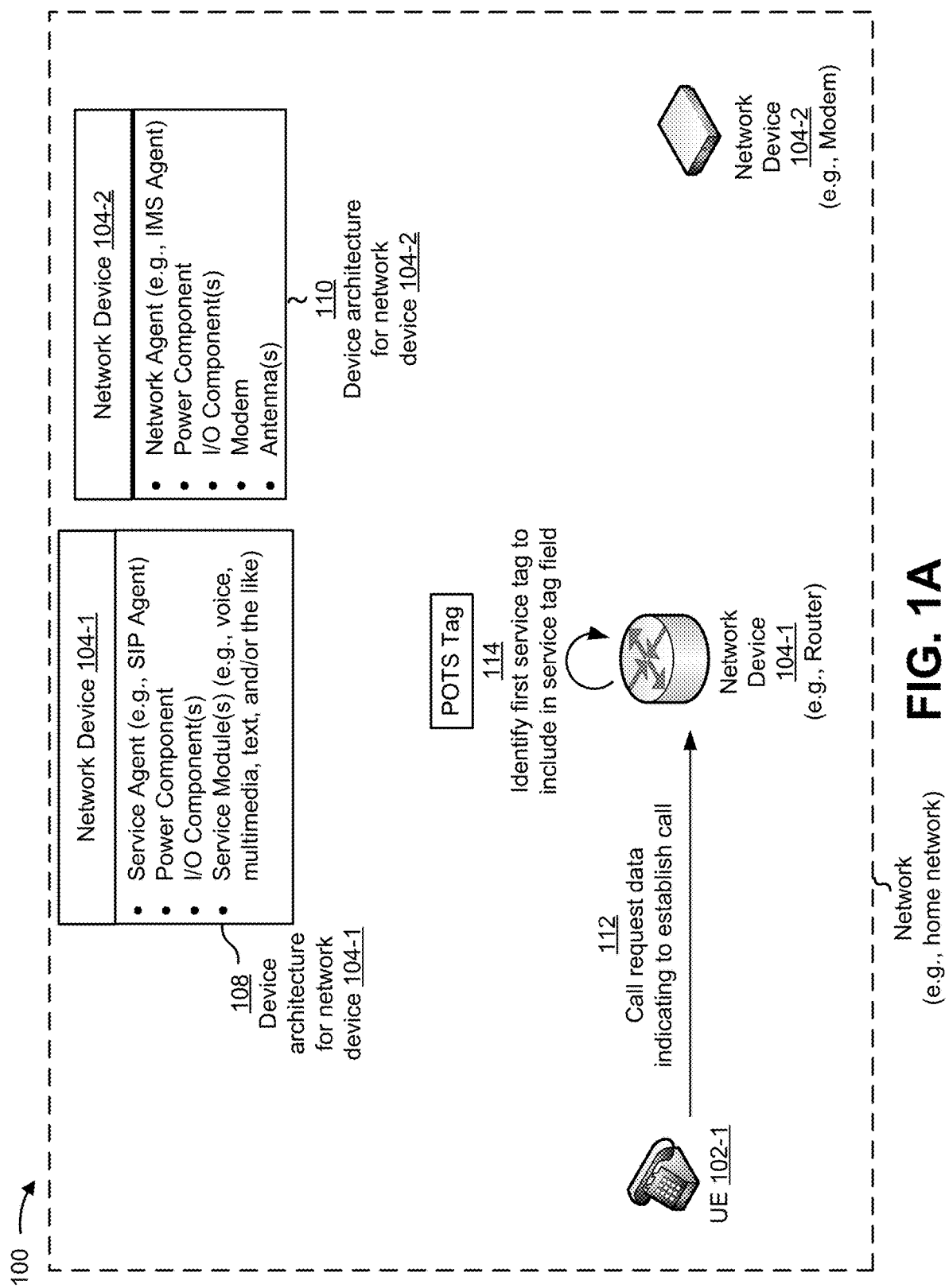
FIGS. 1A-1C are diagrams of one or more example implementations described herein.

The following detailed description of example implementations refers to the accompanying drawings. The same reference numbers in different drawings may identify the same or similar elements.

Fixed wireless access (FWA) may provide user devices (e.g., which may be part of a home network of a home) with access to a set of internet protocol (IP) services. The set of IP services may include voice services (e.g., a plain old telephone service (POTS), a voice over long-term evolution (VoLTE) service, a voice over IP (VoIP) service, and/or the like), multimedia services, text services, and/or the like.

To allow the home network to be used to support one or more fifth generation (5G) IP services, the home network may include a modem (e.g., with one or more antennas) and an access point device (e.g., a router) that are located in separate physical locations within the home network. Because of the manner in which some 5G waves propagate, the modem may be positioned close to a window of the home. However, the access point device may be located in a study or living room area and may not be near the window.

Additionally, if the home network is used to access one or more 4G services (e.g., a voice service, such as a VoLTE service, a POTS, and/or the like), specialized hardware may be needed in both the modem and the access point device. For example, to provide user equipment (UE) in the home network with access to a VoLTE service, the modem must be a 4G-compatible modem, and the access point device must be configured with a 4G subscriber identity module (SIM) card that supports VoLTE and/or a 4G-compatible modem. By implementing a home network architecture that includes two separate modems, device resources and/or network resources are inefficiently and/or ineffectively utilized while sending and/or receiving data in connection with IP services via the home network. Moreover, implementing duplicative hardware in the home network architecture creates unnecessary costs.

According to some implementations described herein, a local network (e.g., a home network and/or the like) may include an access point device, a modem with one or more antennas, and a first user equipment (UE), where the access point device and the modem may utilize a service agent, and a network agent, respectively, to establish a session that allows the first UE to use an IP service to communicate with one or more other UEs that are outside of the local network. In some implementations, the first UE may have access to a set of IP services, such as fifth generation (5G) IP services, fourth generation (4G) IP services, and/or the like. In this case, the access point device and the modem may be placed in separate physical locations in a coverage area of the local network.

Additionally, the service agent of the access point device and the network agent of the modem may perform actions (e.g., as described in connection with FIGS. 1A-1C and FIGS. 2A-2C) that allow the first UE to access the set of IP services, without the access point device having to be configured with specialized hardware. For example, to access voice services, such as a VoLTE service and/or a POTS, the service agent of the access point device may be a session initiation protocol (SIP) agent and the network agent of the modem may be an IP multimedia subsystem (IMS) agent. In this case, the SIP agent and the IMS agent may perform actions that establish a session that will allow the first UE to engage in a VoLTE call with another UE that is outside of the local network, without the access point device having to be configured with a SIM card (e.g., a 4G compatible SIM card) and/or a modem (e.g., a 4G compatible modem). Additional examples are provided herein.

In this way, the first network device and the second network device assist in providing the first UE with access to an IP service (e.g., a voice service), without the first network device being configured with specialized hardware (e.g., a SIM card and/or a modem). Furthermore, use of the service agent and the network agent provides a flexible solution that supports backward compatibility with pre-existing IP services and related devices. Moreover, eliminating the use or multiple modems reduces a utilization of power resources of the first network device (e.g., relative to a solution where the first network device must expend power resources using a 4G modem), reduces manufacturing costs and/or installation costs of the first network device, conserves financial resources of the service provider, reduces overall service cost to the end customer, and/or the like.

Figure 1B:
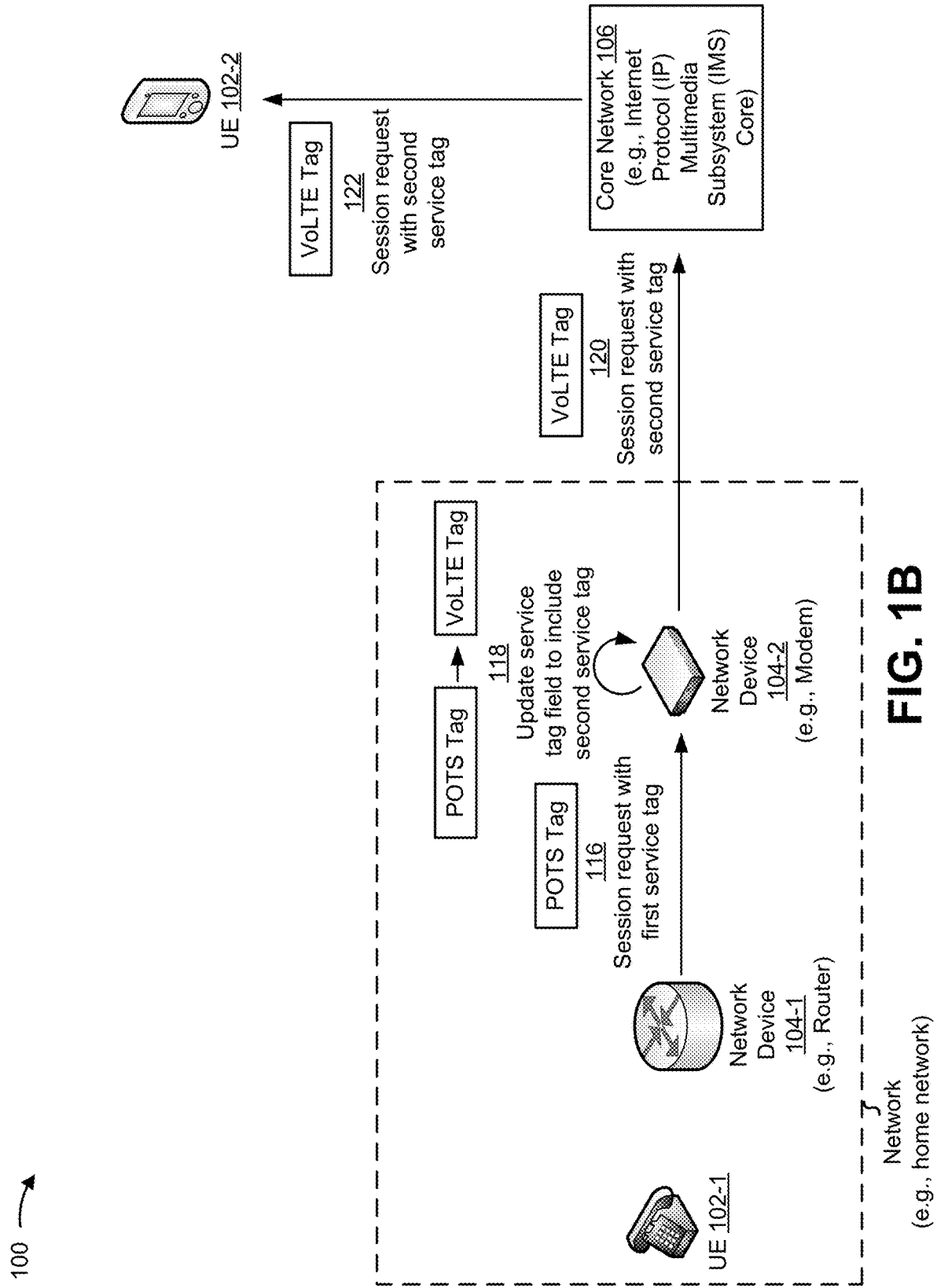
Figure 1C:
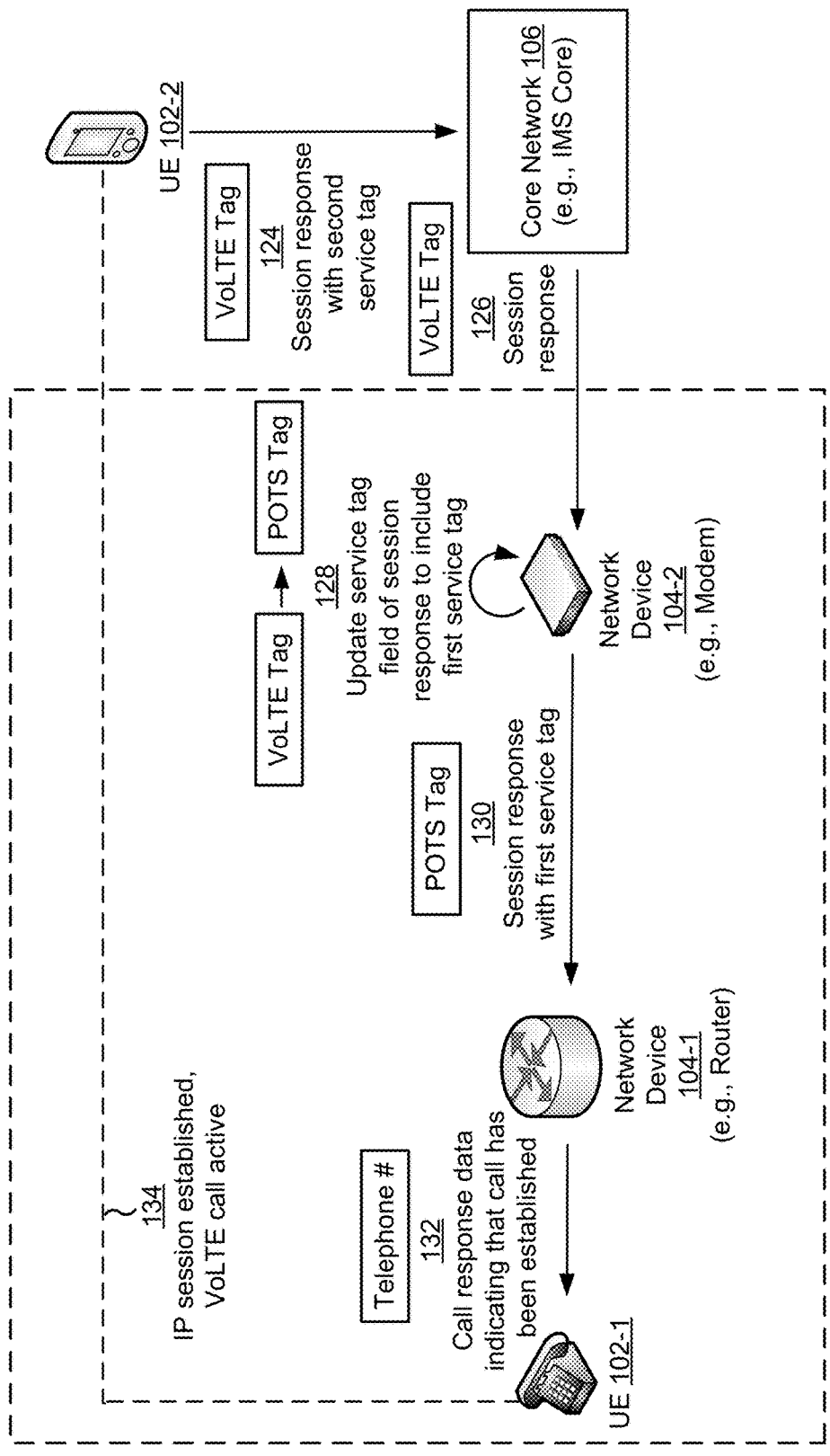

FIGS. 1A-1C are diagrams of one or more example implementations 100 described herein. For example, example implementation(s) 100 may include a first user equipment (UE) (shown as UE 102-1) that is part of a local network, a group of network devices 104 that are part of the local network (shown as network device 104-1 and network device 104-2), a core network 106, and a second UE (shown as UE 102-2) that is outside of the local network. The local network may be a home network, a local area network (LAN), a personal area network (PAN), and/or the like. Network device 104-1 may be an access point device, such as a router and/or a similar type of device. Network device 104-2 may include a modem (and/or a similar type of device) and one or more antennas. Network device 104-1 and network device 104-2 may, for example, be in separate physical locations within a coverage area of the local network. Core network 106 may be an internet protocol (IP)

multimedia subsystem (IMS) core, an evolved packet core (EPC), a fifth generation (5G) core, and/or the like.

As shown in FIGS. 1A-1C, network device 104-1 and network device 104-2 may use a service agent and a network agent, respectively, to perform actions that allow UE 102-1 and UE 102-2 to communicate using an IP service. Additionally, use of the service agent and the network agent may allow UE 102-1 (and/or any other UEs 102 that are connected to the local network) to access the IP service (and/or any other IP services available to devices connected to the local network), without network device 104-1 having to be configured with specialized hardware, such as a fourth generation (4G) compatible SIM card, a 4G compatible modem, and/or the like.

The IP service and/or the one or more other IP services that may be available over the local network may collectively be referred to as a set of IP services, and may include one or more 4G services, one or more 5G services, and/or the like. For example, the set of IP services may include a voice service (e.g., a voice over long-term evolution (VoLTE) service, a plain old telephone service, and/or the like), a multimedia service (e.g., a streaming service), a text service (e.g., a short messaging service (SMS)), and/or the like.

In some implementations, UE 102-1 and/or UE 102-2 may be a telephone (e.g., that supports a plain old telephone service (POTS)), an IP phone, a video phone, an IoT device, a laptop computer, and/or the like. In the example shown, UE 102-1 may be a telephone that uses a POTS and UE 102-2 may be an IP phone (e.g., a smartphone).

As shown in FIG. 1A, and by reference number 108, network device 104-1 may have a device architecture that includes a set of hardware components and/or software elements. For example, network device 104-1 may include a service agent, a power component, one or more input/output (I/O) components, a set of IP service modules, and/or the like.

The service agent may use one or more functions to communicate with a network agent of network device 104-2 (defined further herein) and/or to communicate with the set of IP service modules of network device 104-1. In some implementations, the service agent may include a session initiation protocol (SIP) agent for assisting with initiating, maintaining, modifying, and/or terminating a session associated with an IP service. In some implementations, an agent utilizing another type of protocol may be used for assisting with initiating, maintaining, modifying, and/or terminating a session associated with the IP service.

The one or more I/O components may include one or more I/O components that support a wireless connection between network device 104-1 and network device 104-2 (e.g., a Wi-Fi card used for a Wi-Fi connection) and/or one or more I/O components that support a wired connection between network device 104-1 and network device 104-2 (e.g., an Ethernet port used to establish an Ethernet connection).

An IP service module may include one or more functions that allow network device 104-1 to communicate with UE 102-1 and/or to communicate with one or more other UEs 102 that are connected to the home network. The communication may be a message relating to initiating, maintaining, modifying, and/or terminating a particular session. The set of IP service modules may include one or more voice modules, one or more multimedia modules, one or more text modules, and/or the like. In some cases, the set of IP service modules may include one voice module, one multimedia module, one text module, and/or the like. In other cases, the set of IP services may include multiple voice modules, multiple multimedia modules, multiple text modules, and/or the like. For example, network device 104-1 may be configured with multiple voice modules, such as a voice module that supports a POTS, a voice module that supports a VoLTE service, a voice module that supports a voice service utilizing 5G technology, and/or the like.

In some implementations, one or more service modules may be configured to network device 104-1 based on one or more corresponding services that are registered to an account of the user (and/or an account associated with a home of the user). For example, if a user registers for a VoLTE service, the voice module may be configured and/or installed to network device 104-1, may be activated on network device 104-1 (e.g., if the voice module is pre-configured but hidden from the user), and/or the like. In this way, network device 104-1 may be configured with specialized software that is able to provide specific services that are part of a service plan of the account of the user.

In some implementations, the device architecture of network device 104-1 will not include a subscriber identity module (SIM) card and/or a modem. For example, the device architecture may exclude a fourth generation (4G) compatible SIM card that may be used to make VoLTE calls and/or a 4G compatible modem that may be used to make VoLTE calls.

As shown by reference number 110, network device 104-2 may have a device architecture that includes a set of hardware components and/or software elements. For example, network device 104-2 may include a network agent, a power component, one or more I/O components, a modem, one or more antennas, and/or the like.

The network agent may include one or more functions that may be used when communicating with one or more core network devices that are part of core network 106 and/or that may be used when communicating with the service agent of network device 104-1. In some implementations, the network agent may include an IMS agent that is capable of communicating with an IMS core. For example, one or more 4G IP services, such as a VoLTE service, may be supported using the IMS core of a 4G network, and the IMS agent may be capable of communicating with one or more core network devices that are part of the IMS core. The one or more I/O components may include one or more I/O components that support a wireless connection between network device 104-1 and network device 104-2 (e.g., a Wi-Fi card used for a Wi-Fi connection) and/or one or more I/O components that support a wired connection between network device 104-1 and network device 104-2 (e.g., an Ethernet port used for an Ethernet connection). The modem may be a 4G compatible modem, a 5G compatible modem, and/or the like. The one or more antennas may include an antenna used to send and/or receive 4G radio waves, an antenna used to send and/or receive 5G millimeter (mm) waves, and/or the like.

As shown by reference number 112, network device 104-1 may receive, from UE 102-1, call request data indicating to establish a call. For example, a user may interact with UE 102-1 to begin calling UE 102-2 (see, e.g., FIG. 1B). This may cause UE 102-1 to provide network device 104-1 with call request data indicating that a call is to be established between UE 102-1 and UE 102-2. In some cases, the call request data may specify a state of UE 102-1 (e.g., which may indicate that UE 102-1 is off-hook and attempting to call UE 102-2).

As shown by reference number 114, network device 104-1 (e.g., the router) may identify a first service tag to include in a service tag field of a session request. For example, network device 104-1 (e.g., the router) may identify a first service tag to include in the session request, such that the first service tag is able to be processed by network device 104-2 (e.g., the modem) and/or used for data transmissions to UE 102-2.

In some implementations, network device 104-1 may generate the request session based on receiving the indication to establish the call. In some implementations, the session request may be a session initiation protocol (SIP) invite. In this case, the session request may include a session description protocol (SDP) offer message, a message timer, one or more service tags, IP address information and/or port information (e.g., for an origin device, a sender device, a next hop device, a destination device, and/or the like), and/or the like. The SDP offer message may include session description data, time description data, media description data (if present), and/or the like. The session description data may include a session identifier, one or more device identifiers (e.g., that identify the origin device, the sender device, the next hop device, the destination device, and/or the like), metadata summarizing functionality of the session, and/or any other session description data needed for establishing the session for the IP service. The service identifier may identify a genus type of IP service, such as a voice service, a multimedia service, a text service, and/or the like.

The message timer may include time information indicating a time at which the session request is generated, a time at which the session request is received, a time at which the session request is to be transmitted to another device, and/or the like. The one or more service tags may specify a genus type of IP service (defined above), a species type of IP service, a vendor and/or manufacturer associated with an IP service, and/or the like. For example, if the IP service is a voice service, a service tag may identify the IP service as a voice service (e.g., using a generic voice service tag), may identify the IP service as a more specific type of voice service, such as a POTS, a VoLTE service, and/or the like.

In the example shown, the session request may be a SIP invite for a VoLTE service. In this example, the SIP invite may include an SDP offer message, a message timer, a POTS tag, IP address information and/or port information (e.g., for network device 104-1, for network device 104-2, and/or the like), and/or the like. While in one or more implementations described herein the session request is a SIP invite, this is provided by way of example. In practice, the session request may be a message that is part of another type of messaging and/or communication protocol, such as a media gateway control protocol (MGCP), a message session relay protocol (MSRP), and/or the like.

In some implementations, to identify the first service tag, network device 104-1 may reference a data structure that stores a set of service tags. The set of service tags may include a particular service tag that is to be used for outgoing data transmissions associated with a particular IP service or type of IP service (e.g., call data from a POTS phone indicating to establish a call, a session request from an IP phone to access an IP service, and/or the like), a particular service tag that is to be used for incoming data transmissions associated with a particular IP service or type of IP service (e.g., call data associated with establishing a call, a session response, and/or the like), a particular service tag that corresponds to an IP service or a type of IP service that may be processed by network device 104-2, a particular service tag that is able to be transmitted to UE 102-1 and/or UE 102-2, rules data that describe one or more rules for determining an appropriate service tag to include in the service tag field, and/or the like. In the example shown, network device 104-1 may reference the data structure to determine that a POTS tag is to be used in the service tag field of the session request.

In some implementations, network device 104-1 may determine that the first service tag field does not need to be updated. For example, if the session request already includes the first service tag (e.g., the POTS tag), network device 104-1 may simply verify that the service tag field includes an appropriate service tag.

In this way, network device 104-1 identifies the first service tag to include in the service tag field of the session request.

As shown in FIG. 1B, and by reference number 116, network device 104-1 may provide the session request that includes the first service tag to network device 104-2. For example, network device 104-1 may provide network device 104-2 with the session request that includes the first service tag using a communication interface, such as a wired interface (e.g., Ethernet) and/or a wireless interface (e.g., Wi-Fi, an application programming interface (API), and/or the like).

As shown by reference number 118, network device 104-2 may update the service tag field to include a second service tag. For example, network device 104-2 (e.g., the modem) may update the service tag in the session request such that the service tag corresponds to a particular format needed for data transmissions to UE 102-2.

In some implementations, network device 104-2 may first determine whether the service tag field needs to be updated. For example, network device 104-2 may reference a data structure that stores data that may be used to determine an appropriate service tag to include in the service tag field. The data, for example, may include a particular service tag that is to be used for outgoing data transmissions (e.g., the session request) associated with a particular IP service or type of IP service, a particular service tag that is to be used for incoming data transmissions (e.g., the session response) associated with a particular IP service or type of IP service, a particular service tag that corresponds to an IP service or a type of IP service that may be processed by network device 104-2, a particular service tag that is able to be transmitted to UE 102-2, rules data that describe one or more rules for determining an appropriate service tag to include in the service tag field, and/or the like.

In the example shown, network device 104-2 may reference the data structure to determine that outgoing data transmissions are to include the second service tag (e.g., the VoLTE tag). Next, network device 104-2 may reference the service tag field to determine that the second service tag is not the value stored in the service tag field. This may cause network device 104-2 to update the service tag field with the second service tag (e.g., by replacing the first service tag with the second service tag).

In some implementations, network device 104-2 may determine that the service tag field does not need to be updated. For example, if the session request already includes the second service tag (e.g., the POTS tag), network device 104-2 may simply verify that the service tag field includes an appropriate service tag.

As shown by reference number 120, network device 104-2 may provide the session request that includes the second service tag to core network 106. For example, network device 104-2 may use the second service tag to select a particular voice module that may be used to route the session request to UE 102-2 (e.g., via core network 106). This may allow network device 104-2 to provide the session request that includes the second service tag to a base station, and the base station may provide the session request to a first endpoint device within core network 106. The first endpoint device may provide the session request to one or more other core network devices.

As shown by reference number 122, a second endpoint device within core network 106 may provide the session request with the second service tag to UE 102-2.

In this way, network device 104-1 and network device 104-2 assist in providing UE 102-2 with the session request.

As shown in FIG. 1C, and by reference number 124, UE 102-2 may provide a session response with the second service tag to core network 106. For example, UE 102-2 may generate a session response based on receiving the session request and may provide the session response to the second endpoint device within core network 106.

In some implementations, the session response may be a SIP response, such as a 200 OK for INVITE message. The 200 OK message may include an SDP answer message, the second service tag, other data included in the SDP offer message (e.g., IP address and/or port information, and/or the like), and/or the like. The SDP answer message may be a three digit code (e.g., the number 200) that specifies a status of the session request.

In the example shown, the session response may be a 200 OK for INVITE message that specifies that the session request has been successfully processed. In this example, the 200 OK for INVITE message may include an SDP answer message (200), a VoLTE tag, and/or the like. Additionally, or alternatively, the session response may include one or more other types of messages, such as a 100 trying message, a 180 ringing message, a provisional acknowledgement (PRACK) message, an acknowledgement message, and/or the like.

As shown by reference number 126, network device 104-2 may receive the session response that includes the second service tag from an endpoint device of core network 106. For example, network device 104-2 may receive the session response that includes the second service tag from the first endpoint device of core network 106.

As shown by reference number 128, network device 104-2 may update a service tag field of the session response to include the first service tag. For example, network device 104-1 (e.g., the router) may be configured with a specific voice module (e.g., a specific type of voice solution, a voice solution associated with a specific vendor, and/or the like) and/or may need to transmit data to UE 102-1 in a particular format. Consequently, network device 104-2 (e.g., the modem) may update the service tag in the session request such that the service tag corresponds to the specific voice module of network device 104-1 (e.g., the router) and/or corresponds to the particular format needed for data transmissions to UE 102-1.

In some implementations, to determine whether the service tag field of the session response needs to be updated, network device 104-2 may reference the data structure that stores data that may be used to determine an appropriate service tag to include in the service tag field. In the example shown, network device 104-2 may reference the data structure to determine that incoming data transmissions are to include the first service tag (e.g., the POTS tag). This may allow network device 104-2 to reference the service tag field to determine that the value is not the first service tag, which may cause network device 104-2 to update the service tag field with the first service tag (e.g., the POTS tag) (e.g., by replacing the second service tag with the first service tag).

As shown by reference number 130, network device 104-2 may provide the session response with the first service tag to network device 104-1. For example, network device 104-2 may provide the session response with the first service tag using the communication interface described in connection with FIG. 1A. As shown by reference number 132, network device 104-1 may provide, to UE 102-1, call response data indicating that the call has been established. For example, network device 104-1 (e.g., using the voice module) may generate call response data that indicates that the call has been established and that is in a format that may be processed by UE 102-1.

As shown by reference number 134, the session between UE 102-1 and UE 102-2 may be established. For example, the session may be established based on UE 102-1 receiving the session response, which may cause a VoLTE call between UE 102-1 and UE 102-2 to be established. In some implementations (not shown), UE 102-1 may also send UE 102-2 an acknowledgement packet indicating that the session response has been received. The acknowledgement packet may be received via core network 106, via network device 104-1, and via network device 104-2.

In this way, network device 104-1 and network device 104-2 assist in providing UE 102-1 with access to the IP service, without network device 104-1 being configured with specialized hardware. This conserves resources (e.g., processing resources, network resources, memory resources, and/or the like) of network device 104-2, provides a flexible, backward compatible solution for delivering IP services, reduces costs for a service provider by eliminating a need for duplicative hardware, and/or the like.

As indicated above, FIGS. 1A-1C are provided as examples. Other examples can differ from what is described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple and/or distributed devices. Additionally, or alternatively, a set of devices (e.g., one or more devices) of example implementation 100 may perform one or more functions described as being performed by another set of devices of example implementation 100.

Figure 2A:
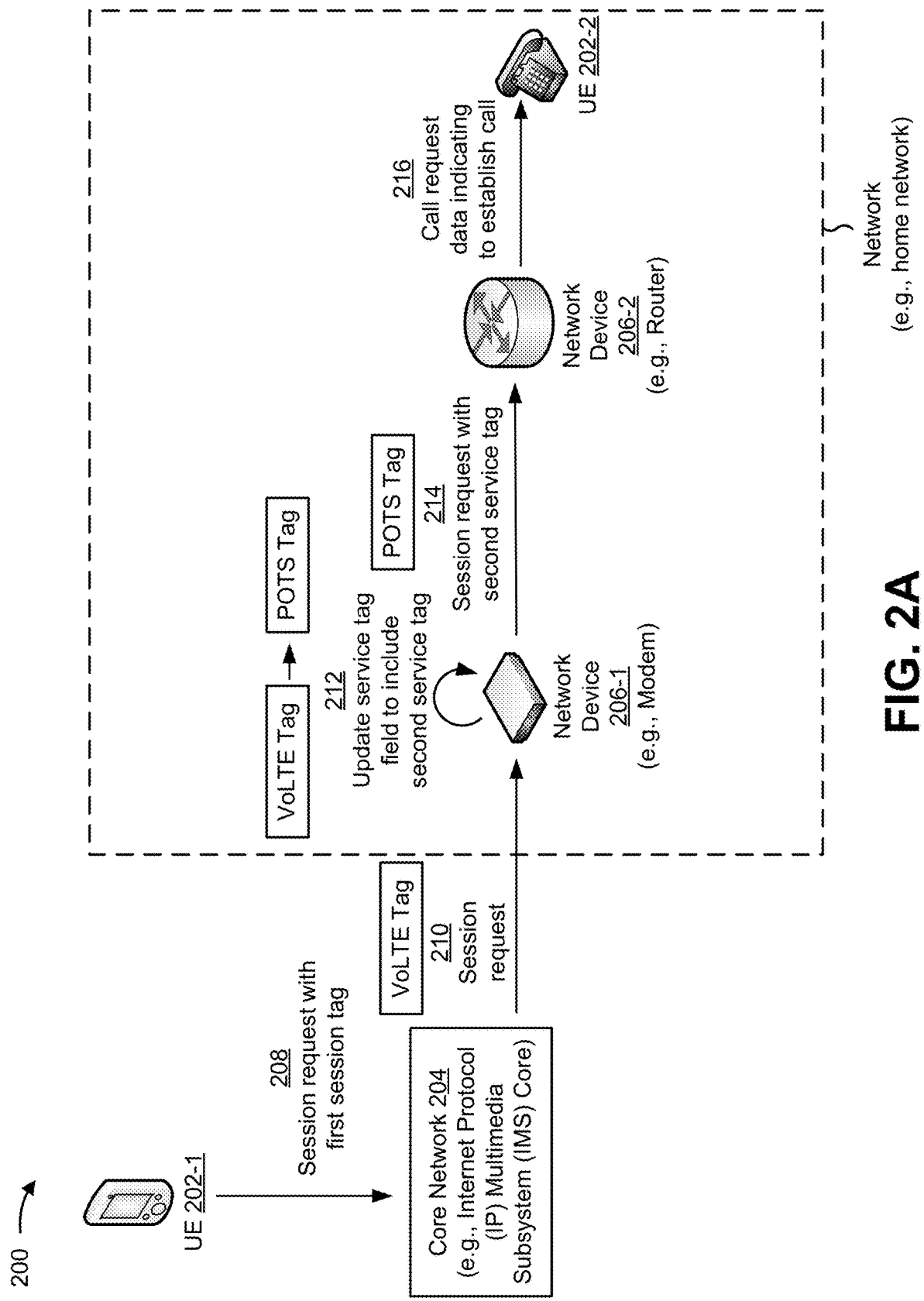
FIGS. 2A-2C are diagrams of one or more example implementations described herein.
Figure 2B:
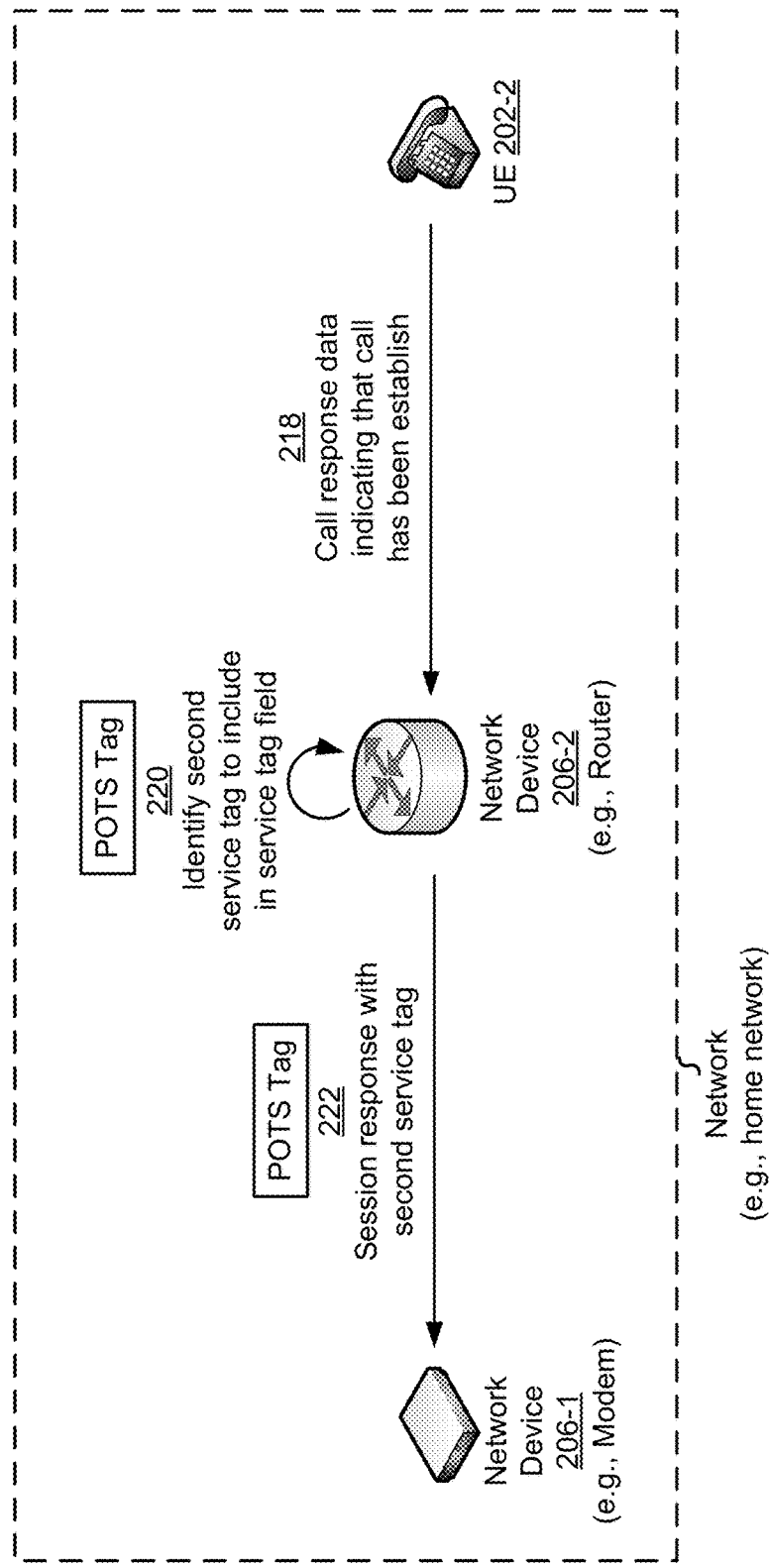
Figure 2C:
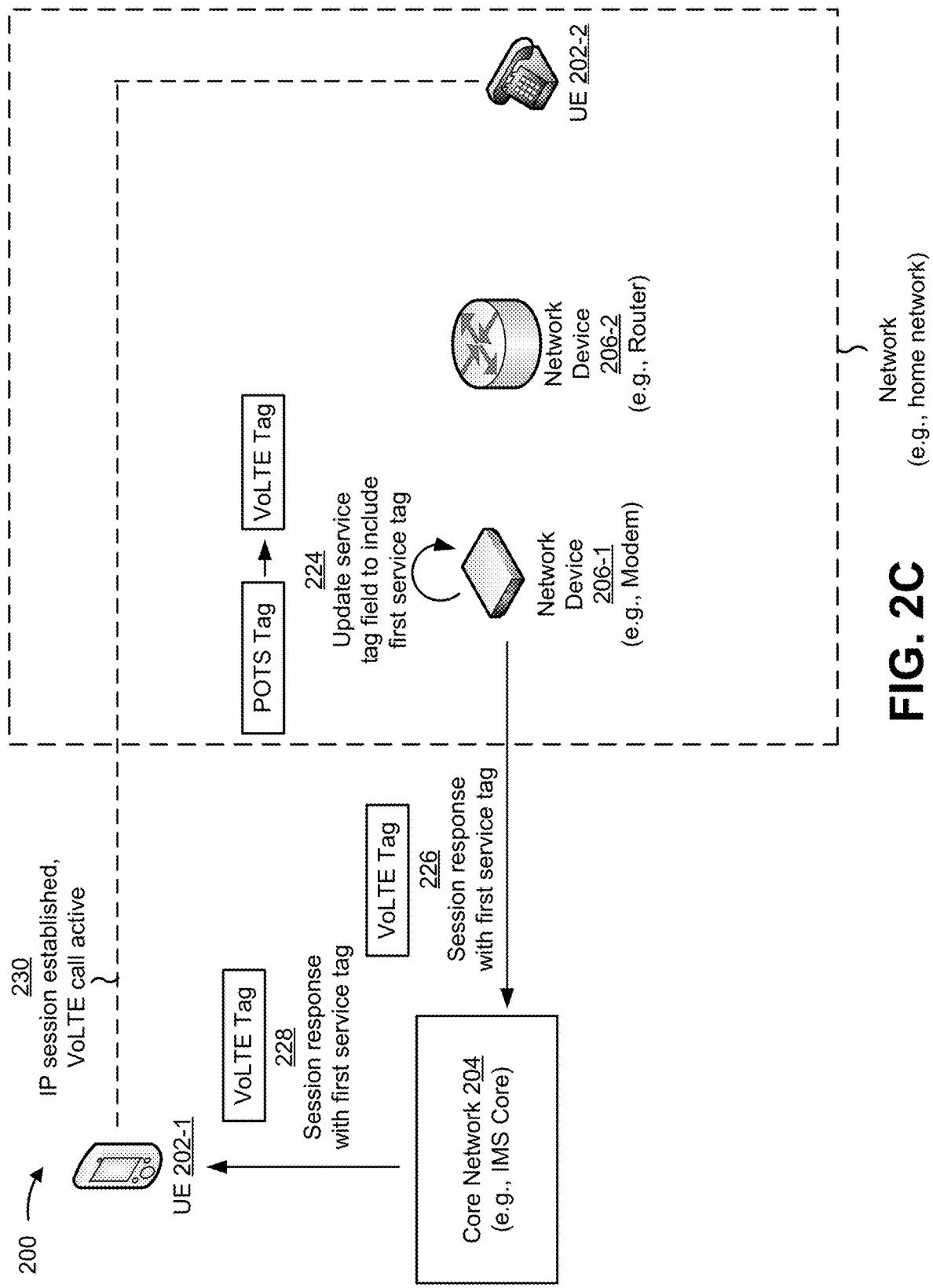

FIGS. 2A-2C are diagrams of one or more example implementations 200 described herein. For example, example implementation(s) 200 may include a first user equipment (UE) (shown as UE 202-1), a core network 204, a group of network devices 206 that are part of a local network (shown as network device 206-1 and network device 206-2), and a second UE (shown as UE 202-2) that is part of the local network.

As shown in FIGS. 2A-2C, network device 206-1 and network device 206-2 may use a network agent and a service agent, respectively, to perform actions that allow UE 202-1 and UE 202-2 to communicate using an IP service. Additionally, use of the network agent and the service agent may allow UE 202-2 (and/or any other UEs 202 that are connected to the local network) to access the IP service (and/or any other IP services available to devices connected to the local network), without network device 206-2 being configured with specialized hardware (such as a 4G compatible SIM card, a 4G compatible modem, and/or the like). In the example shown, UE 202-1 may be a mobile device (e.g., a smartphone) that may be calling UE 202-2, which may be a telephone using a POTS (see above description of FIGS. 1A-1C).

As shown in FIG. 2A, and by reference number 208, one or more core network devices may receive, from UE 202-1, a session request with a first service tag that may be used to establish a session for the IP service. For example, a user may interact with UE 202-1 to begin calling UE 202-2. In this case, UE 202-1 may generate and provide core network 204 with the session request to establish the IP session. The session request may include a first service tag (e.g., a VoLTE tag) because a session request may be for a voice over long-term evolution (VoLTE) call and may need to be tagged with the VoLTE tag to be in a format that may be transmitted via core network 204, to be in a format that may be processed by network device 206-1, and/or the like, as explained further herein.

As shown by reference number 210, network device 206-1 may receive the session request that includes the first service tag from core network 204. For example, network device 206-1 may receive the session request that includes the first service tag (e.g., the VoLTE tag) from an endpoint device in core network 204.

As shown by reference number 212, network device 206-1 (e.g., the modem) may update the service tag field of the session request to include a second service tag. For example, network device 206-2 (e.g., the router) may be configured with a specific voice module (e.g., a specific type of voice solution, a voice solution associated with a specific vendor, and/or the like) and/or may need to transmit data to UE 202-2 in a particular format. Consequently, network device 206-1 (e.g., the modem) may update the service tag in the session request such that the service tag corresponds to the specific voice module of network device 206-2 (e.g., the router) and/or corresponds to the particular format needed for data transmissions to UE 202-2.

In some implementations, to determine whether the service tag field needs to be updated, network device 206-1 may reference a data structure that stores data that may be used to determine an appropriate service tag to include in the service tag field. The data, for example, may include a particular service tag that is to be used for outgoing data transmissions (e.g., the session request) associated with a particular IP service or type of IP service, a particular service tag that is to be used for incoming data transmissions (e.g., the session response) associated with a particular IP service or type of IP service, a particular service tag that corresponds to an IP service or a type of IP service that may be processed by network device 206-2, a particular service tag that is able to be transmitted to UE 202-2, rules data that describe one or more rules for determining an appropriate service tag to include in the service tag field, and/or the like.

In the example shown, network device 206-1 may reference the data structure to determine that incoming data transmissions are to include the second service tag (e.g., the POTS tag). Next, network device 206-1 may reference the service tag field to determine that the second service tag is not the value stored in the service tag field. This may cause network device 206-1 to update the service tag field with the second service tag (e.g., by replacing the first service tag with the second service tag).

In some implementations, network device 206-1 may determine that the service tag field does not need to be updated. For example, if the session request already includes the second service tag (e.g., the POTS tag), network device 206-1 may simply verify that the service tag field includes an appropriate service tag.

As shown by reference number 214, network device 206-2 may provide network device 206-1 with the session request that includes the second service tag. For example, network device 206-2 may provide network device 206-1 with the session request using a communication interface, such as a wired interface (e.g., Ethernet) and/or a wireless interface (e.g., Wi-Fi, an application programming interface (API), and/or the like).

As shown by reference number 216, network device 206-2 may provide UE 202-2 with call request data indicating to establish the call. For example, network device 206-2 (e.g., using a voice module) may provide UE 202-2 with call request data indicating to establish, wherein the call request data is in a format capable of being processed by UE 202-2.

In this way, network device 206-1 and network device 206-2 assist in providing UE 202-2 with the call request data.

As shown in FIG. 2B, and by reference number 218, UE 202-2 may provide, to network device 206, call response data indicating that the call has been established. For example, UE 202-2 may, based on receiving the call request data, generate and provide network device 206-2 with call response data indicating that the call has been established. In some cases, the call response data may specify a state of UE 202-2 (e.g., which may indicate that UE 202-2 is off-hook and attempting to communicate with UE 202-1).

As shown by reference number 220, network device 206-2 (e.g., the router) may identify the second service tag to include in the service tag field of a session response. For example, network device 206-2 may identify the second service tag to include in the session request, such that the second service tag may be transmitted to network device 206-1.

In some implementations, network device 206-2 may generate the session response based on receiving the call response data. In some implementations, to identify the second service tag, network device 206-2 may reference a data structure that stores a set of service tags (as described in connection with FIGS. 1A-1C).

As shown by reference number 222, network device 206-2 may provide the session response that includes the second service tag to network device 206-2.

In this way, the session response is provided to network device 206-1 (e.g., which may route the session response via core network 204, as described below).

As shown in FIG. 2C, and by reference number 224, network device 206-1 may update the service tag field to include the first service tag. For example, network device 206-1 may reference the data structure to determine that outgoing data transmissions are to include the first service tag (e.g., the VoLTE tag). In this case, the session response may be identified as an outgoing data transmission because the session response is to be routed outside of the local network. This may allow network device 206-1 to reference the service tag field to determine that the value is not the first service tag (e.g., the VoLTE tag), which may cause network device 206-1 to update the service tag field with the first service tag (e.g., by replacing the second service tag with the first service tag).

As shown by reference number 226, network device 206-1 may provide the session response with the first service tag to core network 204. For example, network device 206-1 may process the session response to identify the first service tag and may use the first service tag to select a particular voice module that may be used to route the session response to UE 202-1 (e.g., via core network 204). In this case, network device 206-1 may use the particular voice module to provide the session response that includes the first service tag to core network 204.

As shown by reference number 228, one or more core network devices of core network 204 may provide the session response that includes the first service tag to UE 202-1. As shown by reference number 230, the session between UE 202-1 and UE 202-2 may be established. For example, the session may be established based on UE 202-1 receiving the session response, which may cause a VoLTE call between UE 202-1 and UE 202-2 to be active. In some implementations (not shown), UE 202-1 may also send UE 202-2 an acknowledgement packet indicating that the session response has been received. The acknowledgement packet may be received via core network 204, via network device 206-1, and via network device 206-2.

In this way, network device 206-1 and network device 206-2 assist in providing UE 202-2 with access to the IP service, without network device 206-2 being configured with specialized hardware. This conserves resources (e.g., processing resources, network resources, memory resources, and/or the like) of network device 206-2, provides a flexible, backward compatible solution for delivering IP services, reducing cost for a service provider by eliminating a need for duplicative hardware, and/or the like.

As indicated above, FIGS. 2A-2C are provided as examples. Other examples can differ from what is described with regard to FIGS. 2A-2C. For example, there may be additional devices and/or networks, fewer devices and/or networks, different devices and/or networks, or differently arranged devices and/or networks than those shown in FIGS. 2A-2C. Furthermore, two or more devices shown in FIGS. 2A-2C may be implemented within a single device, or a single device shown in FIGS. 2A-2C may be implemented as multiple and/or distributed devices. Additionally, or alternatively, a set of devices (e.g., one or more devices) of example implementation 200 may perform one or more functions described as being performed by another set of devices of example implementation 200.

Figure 3A:
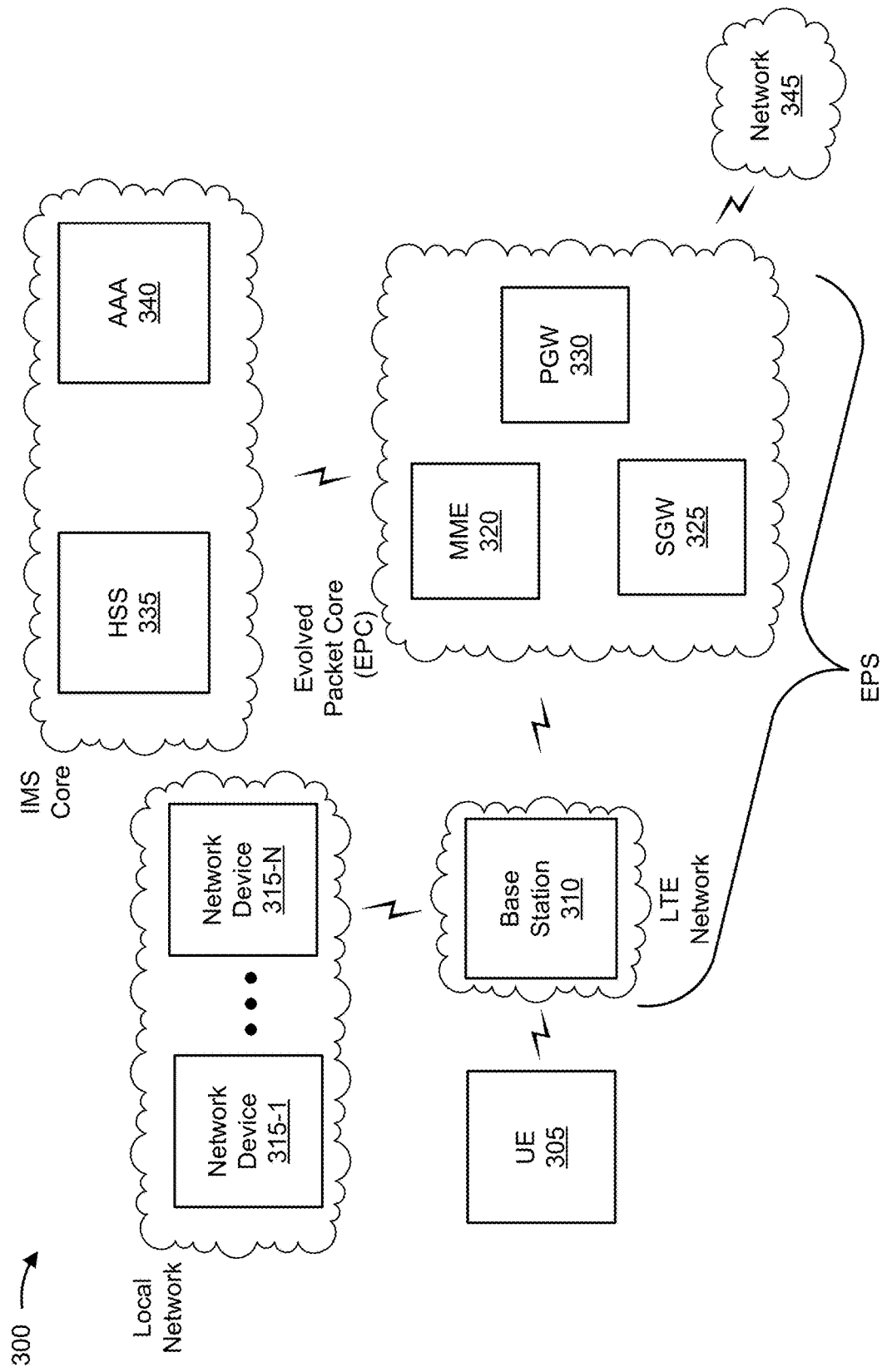
FIGS. 3A and 3B are diagrams of one or more example environments in which systems and/or methods described herein may be implemented.

FIG. 3A is a diagram of an example environment 300 in which systems and/or methods described herein may be implemented. As shown in FIG. 3A, environment 300 may include a user equipment (UE) 305, a base station 310, a group of network devices 315 (shown as network device 315-1 through network device 315-N), a mobility management entity (MME) 320, a serving gateway (SGW) 325, a packet data network gateway (PGW) 330, a home subscriber server (HSS) 335, an authentication, authorization, and accounting server (AAA) 340, and/or a network 345. Devices of environment 300 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a fifth generation (5G) network or a third generation (3G) network.

Environment 200 may include an evolved packet system (EPS) that includes an LTE network and/or an evolved packet core (EPC) that operate based on a third-generation partnership project (3GPP) wireless communication standard. The LTE network may include a radio access network (RAN) that includes one or more base stations 310 that take the form of evolved Node Bs (eNBs) via which UE 305 communicates with the EPC. The EPC may include MME 320, SGW 325, and/or PGW 330 that enable UE 305 to communicate with network 345 and/or an Internet protocol (IP) multimedia subsystem (IMS) core. The IMS core may include HSS 335 and/or AAA 340, and may manage device registration and authentication, session initiation, etc., associated with UE 305. HSS 335 and/or AAA 340 may reside in the EPC and/or the IMS core.

UE 305 may include one or more devices capable of communicating with base station 310 and/or a network (e.g., network 345). For example, UE 305 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 305 may be capable of communicating using uplink (e.g., UE to base station) communications, downlink (e.g., base station to UE) communications, and/or side link (e.g., UE-to-UE) communications. In some implementations, UE 305 may include a machine-type communication (MTC) UE, such as an evolved or enhanced MTC (eMTC) UE. In some implementations, UE 305 may include an Internet of Things (IoT) UE, such as a narrowband IoT (NB-IoT) UE and/or the like.

In some implementations, one or more UEs 305 may be part of a local network, such as a home network, a local area network (LAN), a personal area network (PAN), and/or the like. The one or more UEs 305 may be able to access a set of internet protocol (IP) services over the local network. In some implementations, a first UE 305 may provide a first network device 315 (e.g., a router) with a session request to establish a session for an IP service that will allow the first UE 305 to communicate with a second UE 305 that is outside of the local network. In some implementations, the first UE 305 may provide the first network device 315 with call request data indicating to establish a connection with the second UE 305. The second UE 305 may receive the session request from a second network device 315 (e.g., a modem that provides the session request or the call request data to the second UE 305 via the IMS core).

In some implementations, the second UE 305 may provide a session response to the second network device 315 (e.g., the modem). In some implementations, the second UE 305 may provide call response data to the second network device 315. This may cause the session response (or the call response data) to be routed through the local network (e.g., from the second network device 315 to the first network device 315) to the first UE 305. In some implementations, the first UE 305 and the second UE 305 may, based on the first UE 305 receiving the session response, establish a session that may be used to send and/or receive traffic associated with the IP service.

Base station 310 includes one or more devices capable of communicating with UE 305 using a cellular Radio Access Technology (RAT). For example, base station 310 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 310 may transfer traffic between UE 305 (e.g., using a cellular RAT), other base stations 310 (e.g., using a wireless interface or a backhaul interface, such as a wired backhaul interface), and/or network 345. Base station 310 may provide one or more cells that cover geographic areas. Some base stations 310 may be mobile base stations. Some base stations 310 may be capable of communicating using multiple RATs.

In some implementations, base station 310 may perform scheduling and/or resource management for UEs 305 covered by base station 310 (e.g., UEs 305 covered by a cell provided by base station 310). In some implementations, base stations 310 may be controlled or coordinated by a network controller, which may perform load balancing, network-level configuration, and/or the like. The network controller may communicate with base stations 310 via a wireless or wireline backhaul. In some implementations, base station 310 may include a network controller, a self-organizing network (SON) module or component, or a similar module or component. In other words, a base station 310 may perform network control, scheduling, and/or network management functions (e.g., for other base stations 310 and/or for uplink, downlink, and/or side link communications of UEs 305 covered by the base station 310). In some implementations, base station 310 may include a central unit and multiple distributed units. The central unit may coordinate access control and communication with regard to the multiple distributed units. The multiple distributed units may provide UEs 305 and/or other base stations 310 with access to network 345. In some implementations, base station 310 may send and/or receive information associated with establishing a session for an IP service.

Network device 315 includes one or more devices capable of receiving, processing, forwarding, and/or transferring information associated with an IP service. For example, network device 315 may include an access point device (e.g., a router), a modem, a gateway, and/or the like. In some implementations, network device 315 may be a physical device implemented within a housing, such as a chassis. In some implementations, network device 315 may be a virtual device implemented by one or more computer devices of a cloud computing environment or a data center. Additional information regarding network device 315 is provided in connection with FIG. 3B.

MME 320 may include one or more devices, such as one or more server devices, capable of managing authentication, activation, deactivation, and/or mobility functions associated with UE 305. In some implementations, MME 320 may perform operations relating to authentication of UE 305. Additionally, or alternatively, MME 320 may facilitate the selection of a particular SGW 325 and/or a particular PGW 330 to serve traffic to and/or from UE 305. MME 320 may perform operations associated with handing off UE 305 from a first base station 310 to a second base station 310 when UE 305 is transitioning from a first cell associated with the first base station 310 to a second cell associated with the second base station 310. Additionally, or alternatively, MME 320 may select another MME (not pictured), to which UE 305 should be handed off (e.g., when UE 305 moves out of range of MME 320).

SGW 325 may include one or more devices capable of routing packets. For example, SGW 325 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, SGW 325 may aggregate traffic received from one or more base stations 310 associated with the LTE network and may send the aggregated traffic to network 345 (e.g., via PGW 330) and/or other network devices associated with the EPC and/or the IMS core. SGW 325 may also receive traffic from network 345 and/or other network devices and may send the received traffic to UE 305 via base station 310. Additionally, or alternatively, SGW 325 may perform operations associated with handing off UE 305 to and/or from an LTE network.

PGW 330 may include one or more devices capable of providing connectivity for UE 305 to external packet data networks (e.g., other than the depicted EPC and/or LTE network). For example, PGW 330 may include one or more data processing and/or traffic transfer devices, such as a gateway, a router, a modem, a switch, a firewall, a MC, a hub, a bridge, a server device, an OADM, or any other type of device that processes and/or transfers traffic. In some implementations, PGW 330 may aggregate traffic received from one or more SGWs 325 and may send the aggregated traffic to network 345. Additionally, or alternatively, PGW 330 may receive traffic from network 345, and may send the traffic to UE 305 via SGW 325 and base station 310. PGW 330 may record data usage information (e.g., byte usage), and may provide the data usage information to AAA 340.

HSS 335 may include one or more devices, such as one or more server devices, capable of managing (e.g., receiving, generating, storing, processing, and/or providing) information associated with UE 305. For example, HSS 335 may manage subscription information associated with UE 305, such as information that identifies a subscriber profile of a user associated with UE 305, information that identifies services and/or applications that are accessible to UE 305, location information associated with UE 305, a network identifier (e.g., a network address) that identifies UE 305, information that identifies a treatment of UE 305 (e.g., quality of service information, a quantity of minutes allowed per time period, a quantity of data consumption allowed per time period, etc.), and/or similar information. HSS 335 may provide this information to one or more other devices of environment 200 to support the operations performed by those devices.

AAA 340 may include one or more devices, such as one or more server devices, that perform authentication, authorization, and/or accounting operations for communication sessions associated with UE 305. For example, AAA 340 may perform authentication operations for UE 305 and/or a user of UE 305 (e.g., using one or more credentials), may control access, by UE 305, to a service and/or an application (e.g., based on one or more restrictions, such as time-of-day restrictions, location restrictions, single or multiple access restrictions, read/write restrictions, etc.), may track resources consumed by UE 305 (e.g., a quantity of voice minutes consumed, a quantity of data consumed, etc.), and/or may perform similar operations.

Network 345 may include one or more wired and/or wireless networks. For example, network 345 may include a cellular network (e.g., a 5G network, a 4G network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Figure 3B:
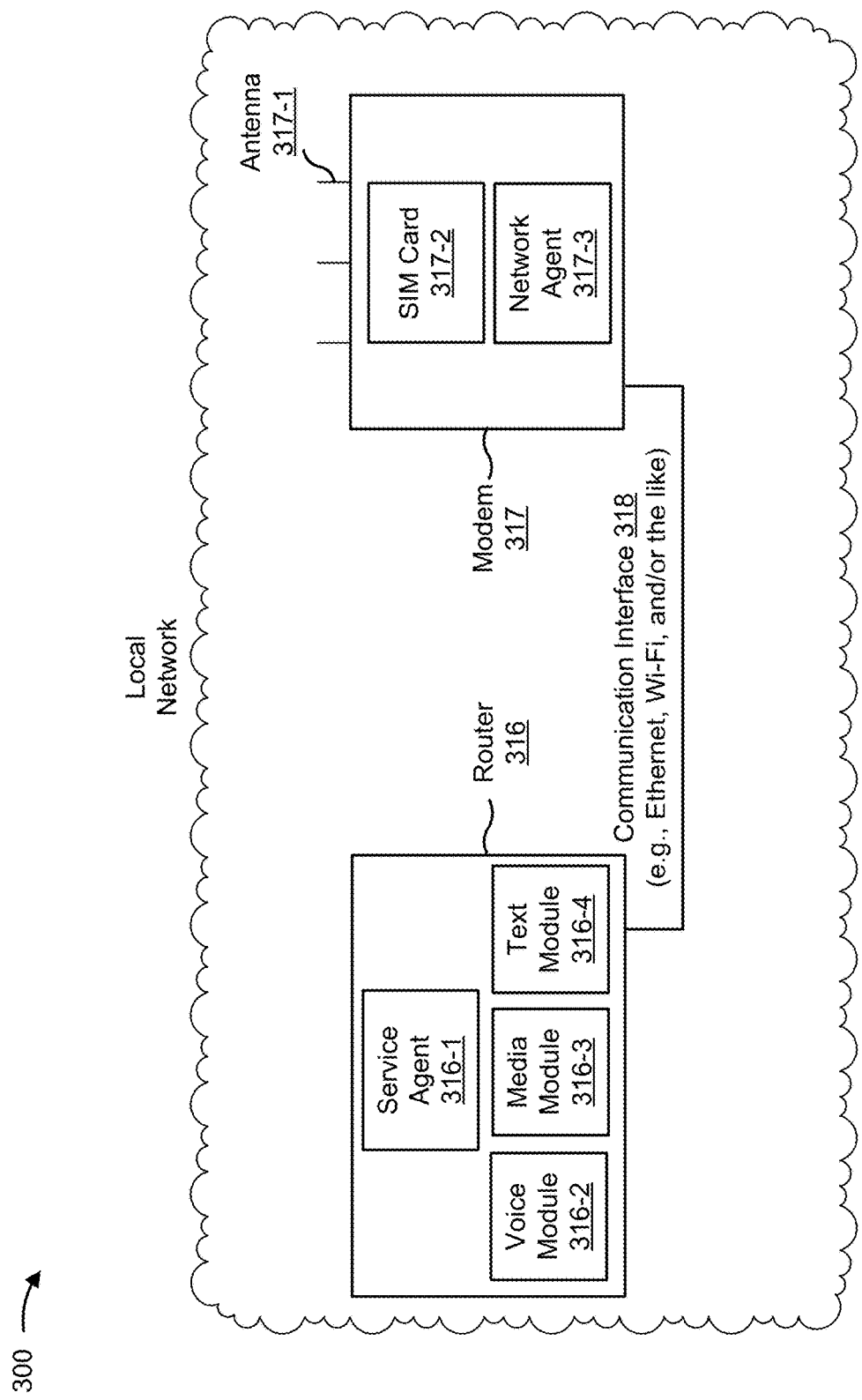

FIG. 3B is a diagram of an example environment 300 in which systems and/or methods described herein may be implemented. As shown in FIG. 3B, the local network in environment 300 may include a group of network devices 315, such as a router 316 and a modem 317.

In some implementations, router 316 may include a label switching router (LSR), a label edge router (LER), an ingress router, an egress router, a provider router (e.g., a provider edge router, a provider core router, and/or the like), a virtual router, and/or the like. In some implementations, router 316 may include a service agent 316-1 that is configured with one or more functions for assisting with initiating, maintaining, modifying, and/or terminating a session associated with an IP service. For example, service agent 316-1 may use the one or more functions to communicate with modem 317 and/or a UE 305 that is part of the local network to assist in establishing a session for an IP service (e.g., by sending, receiving, and/or updating a session request for the session, a session response for the session, and/or the like). In some implementations, service agent 316-1 may be a session initiation protocol (SIP) agent and/or a similar type of agent. In some implementations, router 316 may serve as a user agent server (UAS) and/or a user agent client (UAC) during data transmissions described herein. In some implementations, router 316 may be configured with a set of service modules, such as a voice module 316-2, a multimedia module 316-3, a text module 316-4, and/or the like. The set of service modules may allow service agent 316-1 to communicate with the UE 305 that is part of the local network.

In some implementations, modem 317 may be a 4G modem, a 5G modem, and/or the like. For example, modem 317 may include one or more antennas 317-1 (e.g., an antenna used to send and/or receive 4G radio waves, an antenna used to send and/or receive 5G millimeter (mm) waves, and/or the like), a subscriber identity module (SIM) card 317-2 (e.g., a 4G SIM card, a 5G SIM card, and/or the like), a network agent 317-3, and/or the like.

In some implementations, network agent 317-3 may be configured with one or more functions for assisting with initiating, maintaining, modifying, and/or terminating a session associated with an IP service. For example, network agent 317-3 may use the one or more functions to communicate with router 316 (e.g., with service agent 316-1 of router 316) and/or the IMS core to assist in establishing a session for an IP service (e.g., by sending, receiving, and/or updating a session request for the session, a session response for the session, and/or the like). In some implementations, network agent 317-3 may be an IMS agent and/or a similar type of agent. For example, if network agent 317-3 includes an IMS agent, modem 317 may use the IMS agent to send and/or receive messages (e.g., a session request, a session response, and/or the like) via the IMS core. In some implementations, modem 317 may serve as a UAS and/or a UAC during data transmissions described herein.

In some implementations, router 316 may communicate with a first UE 305 (e.g., that is part of the local network) and/or with modem 317 via a communication interface 318, such as a wired interface (e.g., using Ethernet), a wireless interface (e.g., using Wi-Fi, an application programming interface (API), and/or the like), and/or the like. In some implementations, modem 317 may communicate with router 316 via the communication interface. In some implementations, the communication interface may be an inter-process communication (IPC) interface. In some implementations, modem 317 may communicate with the IMS core using another type of communication interface, such as a communication interface defined by a set of wireless telecommunication standards.

The number and arrangement of devices and networks shown in FIGS. 3A and 3B are provided as an example. In practice, there may be additional devices and/or networks, fewer devices and/or networks, different devices and/or networks, or differently arranged devices and/or networks than those shown in FIGS. 3A and 3B. Furthermore, two or more devices shown in FIGS. 3A and 3B may be implemented within a single device, or a single device shown in FIGS. 3A and 3B may be implemented as multiple, distributed devices. Additionally, or alternatively, a set of devices (e.g., one or more devices) of environment 300 may perform one or more functions described as being performed by another set of devices of environment 300.

Figure 4:
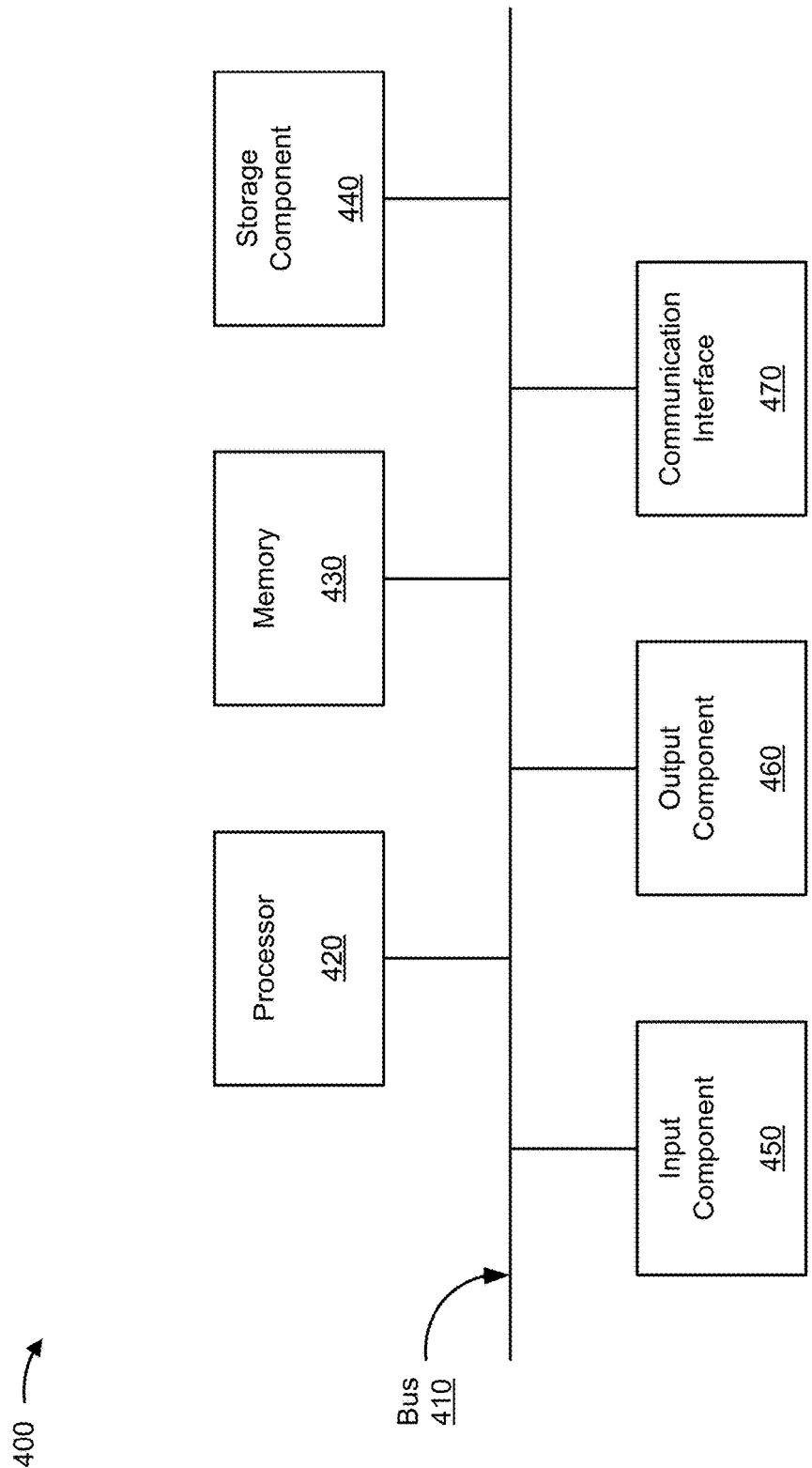
FIG. 4 is a diagram of example components of one or more devices of FIGS. 3A and 3B.

FIG. 4 is a diagram of example components of a device 400. Device 400 may correspond to UE 305, base station 310, network device 315, MME 320, SGW 325, PGW 330, HSS 335, and/or AAA 340. In some implementations, UE 305, base station 310, network device 315, MME 320, SGW 325, PGW 330, HSS 335, and/or AAA 340 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
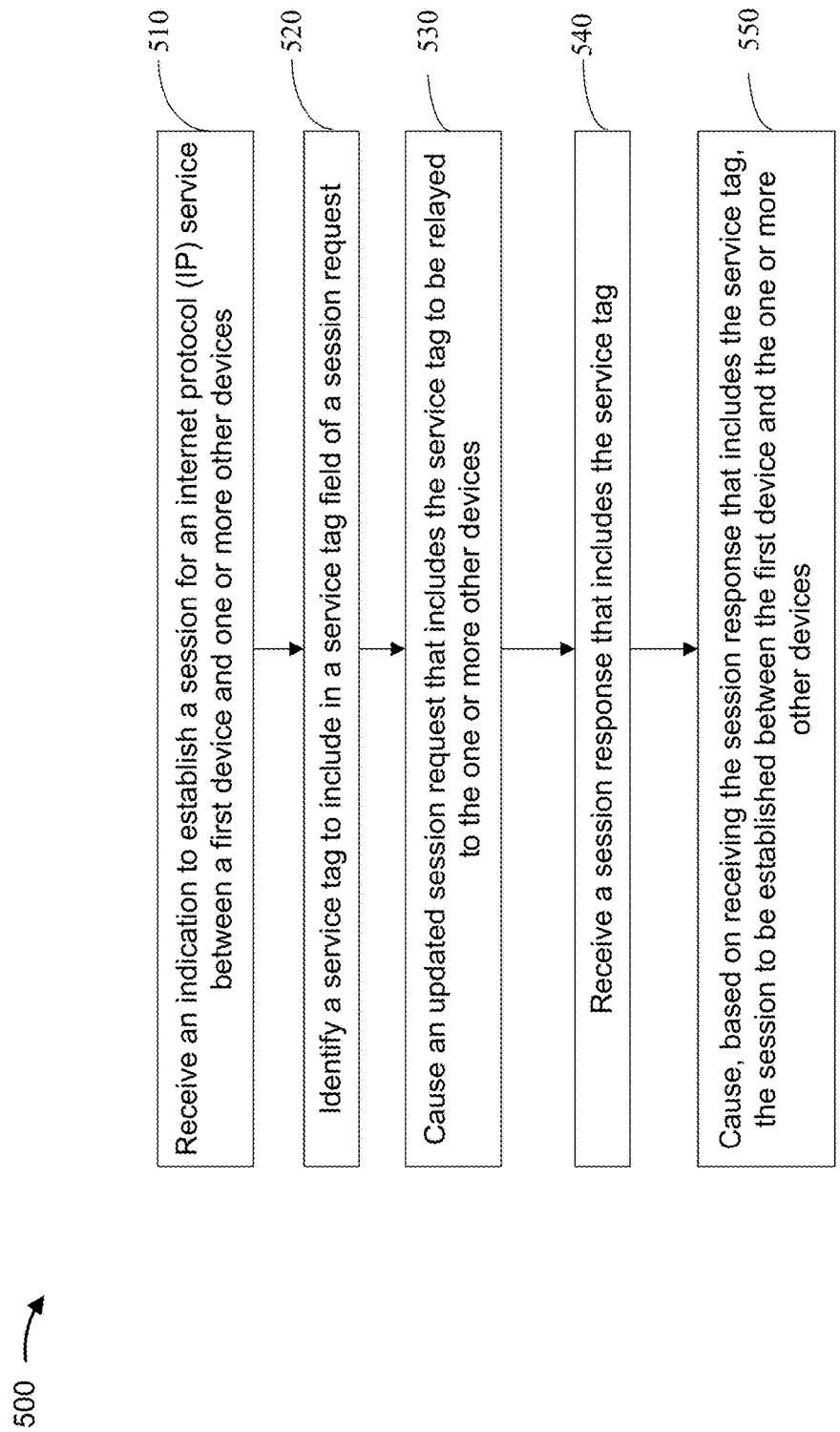
FIG. 5 is a flowchart of an example process for using a service agent of a first network device and a network agent of a second network device to establish a session for an internet protocol (IP) service.

FIG. 5 is a flow chart of an example process 500 for using a service agent of a first network device and a network agent of a second network device to establish a session that allows a first device, which is part of a local network with the first network device and the second network device, to use an internet protocol (IP) service to communicate with one or more other devices. In some implementations, one or more process blocks of FIG. 5 may be performed by a network device (e.g., network device 315). In some implementations, one or more process blocks of FIG. 5 may be performed by another device or a group of devices separate from or including the network device, such as a user equipment (UE) (e.g., UE 305), a base station (e.g., base station 310), another network device (e.g., another network device 315), a core network (e.g., which may include devices associated with an evolved packet core (EPC), devices associated with an IP multimedia subsystem (IMS) core, devices associated with a fifth generation (5G) core network, and/or the like), and/or the like.

As shown in FIG. 5, process 500 may include receiving a session request to establish a session for an internet protocol (IP) service between a first device and one or more other devices (block 510). For example, the network device (e.g., using processor 420, memory 430, storage component 440, input component 450, communication interface 470, and/or the like) may receive a session request to establish a session for an internet protocol (IP) service between a first device and one or more other devices, as described above. In some implementations, the network device may be part of a local network. In some implementations, the network device may be in a location (e.g., a physical location) within the local network that is different than a particular location (e.g. a particular physical location) of another network device in the local network.

In some implementations, the network device may include an access point device. In some implementations, the network device may include a router. In some implementations, the network device may include a set of service modules. In some implementations, the other network device may include a modem with at least one antenna. In some implementations, the modem may be a fourth generation (4G) compatible modem and/or a 5G compatible modem. In some implementations, the IP service may include at least one of: a voice service, a multimedia service, or a text service. In some implementations, the first device and the one or more other devices may include a telephone that utilizes a plain old telephone service (POTS), an IP phone, or a video phone.

As further shown in FIG. 5, process 500 may include identifying a service tag to include in a service tag field of a session request (block 520). For example, the network device (e.g., using processor 420, memory 430, storage component 440, and/or the like) may identify a service tag to include in a service tag field of a session request, as described above. In some implementations, the service tag may be in a format capable of being processed by the other network device.

In some implementations, the IP service may include a voice service. In some implementations, the first service tag may identify a type of voice service. For example, the first service tag may be a plain old telephone service (POTS) tag that identifies a POTS, or a voice over long-term evolution (VoLTE) tag that identifies a VoLTE service. In some implementations, the network device may not have to update the service tag field of the session request.

As further shown in FIG. 5, process 500 may include causing the session request that includes the service tag to be relayed to the one or more other devices (block 530). For example, the network device (e.g., using processor 420, memory 430, storage component 440, output component 460, communication interface 470, and/or the like) may cause the session request that includes the service tag to be relayed to the one or more other devices, as described above. In some implementations, the session request may be relayed to the one or more other devices based on a service agent of the network device communicating with a network agent of the other network device.

In some implementations, the service agent (e.g., the SIP agent) may include a set of functions that allow the session to be established without the network device being configured with a subscriber identity module (SIM) card or a modem. For example, one or more processors of the network device may use the SIP agent to execute the set of functions to provide the session request to the other network device in a manner that eliminates a need for the network device to include a SIM card and/or a modem.

In some implementations, the service agent may include a session initiation protocol (SIP) agent. In some implementations, the network agent may include an IP multimedia subsystem (IMS) agent. In some implementations, the service agent and the network agent may communicate via a wireless interface or a wired interface. In some implementations, when causing the updated session to be relayed to the one or more other devices, the network device (e.g., a router) may provide, using the SIP agent, the session request to the IMS agent of the other network device to cause the IMS agent to relay, to the one or more other devices, the session request via an IMS core.

In some implementations, when updating the service tag field, the network device may identify the service tag field within the session request. Additionally, the network device may select the first service tag, of a set of available service tags, based on at least one of: content included in the session request, or configuration data accessible to the network device. Additionally, the network device may update the service tag field with the first service tag.

As further shown in FIG. 5, process 500 may include receiving a session response that includes the service tag (block 540). For example, the network device (e.g., using processor 420, memory 430, storage component 440, input component 450, communication interface 470, and/or the like) may receive a session response that includes the service tag, as described above.

In some implementations, the IP service may include a voice service. In this case, the second service tag may be a VoLTE tag or a POTS tag, wherein the second service tag is different than the first service tag.

In some implementations, the network device may receive a session response that includes the first service tag and may update the service tag field of the session response to include a second service tag that is in a format capable of being processed by the other network device. For example, if the network device is a modem such as that shown in FIG. 1C, and/or a router such as that shown in FIG. 2B, the network device may receive a session response that includes the first service tag and may update the service tag field of the session response to include a second service tag that is in a format capable of being processed by the other network device. This may allow the network device to provide an updated session response to the other network device to allow the other network device to provide the updated session response to the second device.

As further shown in FIG. 5, process 500 may include causing, based on receiving the session response that includes the service tag, the session to be established between the first device and the one or more other devices (block 550). For example, the network device (e.g., using processor 420, memory 430, storage component 440, output component 460, communication interface 470, and/or the like) may cause, based on receiving the session response that includes the service tag, the session to be established between the first device and the one or more other devices, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device in a local network, an indication to establish a session for an internet protocol (IP) service between a first device and one or more other devices,
      wherein the network device is in a location within the local network that is different than a particular location of another network device in the local network;
   identifying, by the network device, a service tag to include in a service tag field of a session request, wherein the service tag is in a format capable of being processed by the other network device;
causing, by the network device, the session request that includes the service tag to be relayed to the one or more other devices,
wherein the session request is relayed to the one or more other devices by the first device based on a previous communication between a service agent of the network device and a network agent of the other network device;
receiving, by the network device, a session response that includes the service tag; and
causing, by the network device and based on receiving the session response that includes the service tag, the session to be established between the first device and the one or more other devices.

2. The method of claim 1, wherein the network device includes an access point device; and
wherein the service agent includes a set of functions that allow the session to be established without the network device being configured with a subscriber identity module (SIM) card or a modem.

3. The method of claim 1, wherein the network device includes a router;
wherein the other network device includes a modem and an antenna; and
wherein causing the session request to be relayed comprises:
providing, using the router, the session request to the modem of the other network device to cause the modem to relay, to the one or more other devices, the session request via an IP multimedia subsystem (IMS) core.

4. The method of claim 1, wherein the service agent is a session initiation protocol (SIP) agent;
wherein the network agent is an IP multimedia subsystem (IMS) agent; and
wherein causing the session request to be relayed comprises:
providing, using the SIP agent, the session request to the IMS agent of the other network device to cause the IMS agent to relay, to the one or more other devices, the session request via an IMS core.

5. The method of claim 1, wherein identifying the service tag to include in the service tag field comprises:
identifying the service tag, of a set of available service tags, based on at least one of:
content included in the session request, or
configuration data accessible to the network device.

6. The method of claim 1, wherein the IP service includes at least one of:
a voice service,
a multimedia service, or
a text service.

7. The method of claim 1, wherein the IP service includes a voice service; and
wherein the service tag is a plain old telephone service (POTS) tag.

8. A network device, comprising:
one or more memories; and
one or more processors, communicatively coupled to the one or more memories, to:
receive a session request to establish a session between two or more devices,
wherein the network device is part of a local network that includes another network device,
wherein the network device is in a location within the local network that is different than a particular location of the other network device, and
wherein a service tag field of the session request includes a first service tag that identifies a type of voice service;
cause the session request that includes a second service tag to be provided to a first device of the two or more devices;
receive a session response that includes the second service tag; and
cause, using the session response that includes the second service tag, the session to be established.

9. The network device of claim 8, wherein the network device is a modem with at least one antenna.

10. The network device of claim 8, wherein the one or more processors are further to:
update the service tag field of the session request to include the second service tag.

11. The network device of claim 8, wherein the one or more processors are further to:
update a service tag field of the session response to include the first service tag.

12. The network device of claim 8, wherein the one or more processors are further to:
identify an appropriate service tag to include in the service tag field based on at least one of:
content included in the session request, or
configuration data accessible to the network device.

13. The network device of claim 8, wherein the network device is a modem;
wherein the other network device is a router;
wherein the other network device is part of the local network; and
wherein the one or more processors, when providing the session response to the other network device, are to:
provide, using an IP multimedia subsystem (IMS) agent, the session response to the router to cause the router to use a session initiation protocol (SIP) agent to provide the session response to the other network device.

14. The network device of claim 13, wherein the one or more processors, when providing the session response, are to:
use the IMS agent to execute a set of functions to provide the session response to the other network device in a manner that eliminates a need for the other network device to be comprised of a subscriber identity module (SIM) card or a modem.

15. A network comprising:
a first device that establishes a session with one or more other devices that are outside of the network to utilize an internet protocol (IP) service; and
a network device configured to:
identify a service tag to include in a service tag field of a session request,
wherein the service tag is in a format capable of being processed by the other network device,
cause the session request that includes the service tag to be relayed to the one or more other devices,
receive a session response that includes the service tag; and
cause, based on receiving the session response that includes the service tag, the session to be established between the first device and the one or more other devices.

16. The network of claim 15, wherein the session request is relayed to the one or more other devices by the first device based on a previous communication between a service agent of the network device and a network agent of the other network device.

17. The network of claim 16, wherein the network device includes an access point device; and
wherein the service agent includes a set of functions that allow the session to be established without the network device being configured with a subscriber identity module (SIM) card or a modem.

18. The network of claim 16, wherein the service agent is a session initiation protocol (SIP) agent;
wherein the network agent is an IP multimedia subsystem (IMS) agent; and
wherein the network device, when causing the session request to be relayed, is configured to:
provide, using the SIP agent, the session request to the IMS agent of the other network device to cause the IMS agent to relay, to the one or more other devices, the session request via an IMS core.

19. The network of claim 15, wherein the network device includes a router;
wherein the other network device includes a modem and an antenna; and
wherein the network device, when causing the session request to be relayed, is configured to:
provide, using the router, the session request to the modem of the other network device to cause the modem to relay, to the one or more other devices, the session request via an IP multimedia subsystem (IMS) core.

20. The network of claim 15, wherein the network device, when identifying the service tag to include in the service tag field, is configured to:
identify the service tag, of a set of available service tags, based on at least one of:
content included in the session request, or
configuration data accessible to the network device.

* * * * *